United States Patent
Welch et al.

(10) Patent No.: US 7,841,163 B2
(45) Date of Patent: Nov. 30, 2010

(54) TURBOFAN EMERGENCY GENERATOR

(75) Inventors: Richard C. Welch, Rockford, IL (US); Gerard H. Bueche, Byron, IL (US); William T. DeGroff, Rockford, IL (US); Jose Albero, Lachenaie (CA); Jerzy Makuszewski, Mississauga (CA)

(73) Assignees: Hamilton Sundstrand Corporation, Windsor Locks, CT (US); Pratt & Whitney Canada Corp., Quebec (CA)

( * ) Notice: Subject to any disclaimer, the term of this patent is extended or adjusted under 35 U.S.C. 154(b) by 1037 days.

(21) Appl. No.: 11/598,482

(22) Filed: Nov. 13, 2006

(65) Prior Publication Data

US 2008/0110151 A1    May 15, 2008

(51) Int. Cl.
  *F02G 3/00*    (2006.01)
(52) U.S. Cl. .............. 60/39.091; 60/226.1; 60/262; 60/792; 60/802; 60/772
(58) Field of Classification Search ............ 60/262, 60/792, 802, 226.1; 310/67 A, 75 C, 113
See application file for complete search history.

(56) References Cited

U.S. PATENT DOCUMENTS

| | | | |
|---|---|---|---|
| 2,953,900 A * | 9/1960 | Price ............... | 60/262 |
| 4,540,337 A | 9/1985 | Olsen | |
| 4,671,737 A | 6/1987 | Whitehouse | |
| 4,692,093 A | 9/1987 | Safarik | |
| 4,701,104 A | 10/1987 | Cohen | |
| 4,743,163 A | 5/1988 | Markunas et al. | |
| 4,864,812 A * | 9/1989 | Rodgers et al. ...... | 60/39.091 |
| 4,912,921 A * | 4/1990 | Rice et al. ........ | 60/774 |
| 4,950,131 A | 8/1990 | Callerio et al. | |
| 5,249,924 A | 10/1993 | Brum | |
| 5,558,495 A | 9/1996 | Parker et al. | |
| 5,562,417 A | 10/1996 | Grimm et al. | |
| 5,687,561 A | 11/1997 | Newton | |

(Continued)

FOREIGN PATENT DOCUMENTS

EP    0 712 996    5/1996

(Continued)

OTHER PUBLICATIONS

UK Search Report for Application No. GB0722280.5, Mar. 2, 2008.

*Primary Examiner*—Michael Cuff
*Assistant Examiner*—Craig Kim
(74) *Attorney, Agent, or Firm*—Carlson, Gaskey & Olds, P.C.

(57) ABSTRACT

A turbine engine emergency power system includes low and high pressure spools, the lower pressure spool including a low pressure compressor. A turbofan is coupled to the low pressure spool. The turbofan drives the low pressure spool in a windmill condition in which the low pressure turbine fails to provide rotational drive to the turbofan. A generator is rotationally driven by the low pressure spool in the windmill condition. A gear train is used to increase the speed of the generator in one example. In one example embodiment, a centrifugal clutch is used to selectively decouple the generator from the low pressure spool at a predetermined engine speed, which corresponds to normal operating speeds when the turbine engine is under power.

15 Claims, 3 Drawing Sheets

U.S. PATENT DOCUMENTS

| | | |
|---|---|---|
| 5,694,765 A | 12/1997 | Heild et al. |
| 5,779,446 A | 7/1998 | Althof et al. |
| 5,845,483 A | 12/1998 | Petrowicz |
| 5,867,979 A | 2/1999 | Newton et al. |
| 6,467,725 B1 * | 10/2002 | Coles et al. .................. 244/58 |
| 7,042,128 B2 * | 5/2006 | Zepp et al. .................. 310/191 |
| 7,055,303 B2 * | 6/2006 | Macfarlane et al. ........ 60/39.08 |
| 2002/0122717 A1 | 9/2002 | Ghetzler et al. |

FOREIGN PATENT DOCUMENTS

| | | |
|---|---|---|
| EP | 1 050 672 | 11/2000 |
| EP | 1050672 | 11/2000 |
| GB | 2 216 603 | 10/1989 |
| GB | 2 402 718 | 12/2004 |
| WO | WO 86/04385 | 7/1986 |
| WO | 93/06007 | 4/1993 |
| WO | WO 99/14116 | 3/1999 |

* cited by examiner

TURBOFAN EMERGENCY GENERATOR

BACKGROUND OF THE INVENTION

This invention relates to a turbofan driven emergency generator, which is driven by the turbofan when the turbine engine loses power.

In modern, turbofan power aircraft, an emergency power source is required for control of flight surfaces in the event of the total loss of the availability of the primary power sources; i.e. engine driven hydraulic pumps and/or engine driven electrical generators. For small airplanes, this power is provided by the energy stored in aircraft batteries. For larger airplanes, a single ram air turbine (RAT) with an integral generator or hydraulic pump is provided for deployment in an emergency situation only. Here, the emergency power source is the aircraft's own airspeed (kinetic energy) and altitude (potential energy).

To derive maximum power from the ram air, a RAT must be located away from aircraft surfaces that would disturb the smooth (laminar) entry of air into the RAT blades. In practice, this usually means mounting the RAT under the wing or below the nose of the aircraft. Finding a suitable location for the RAT and designing a deployment system to position the RAT into the airstream can present significant challenges for the aircraft design.

An additional consideration is that, there is a possibility that the unshrouded RAT blades could separate from their hub at high velocity during RAT operation, presenting a containment issue.

Also, to minimize installation envelope, RAT systems are typically designed such that once that RAT is deployed it cannot be retracted in flight. For this reason the RAT system is one of very few aircraft systems that is not routinely tested in pre-flight or flight. Scheduled ground testing to deploy and back-driving the RAT must be performed to ensure it will function properly in an emergency event. Again, unshrouded turbine blades are undesirable.

In view of the above, a turbine engine has been devised that employs one or more generators that is driven by the turbofan in a windmill condition when the engine has lost power. However, the generators are continuously coupled to the turbofan and driven at the same speed as the turbofan. As a result, designing a generator that can operate under windmill conditions and high speeds during normal turbine engine operation is problematic. Either too much voltage is produced at high speeds or the generator is too small for windmill conditions. Said another way, the difference in speeds between engine windmilling and engine operating modes may amount to as much as an 8:1 overall speed ratio. This presents a difficult design challenge in that the generator must be large enough to provide full rated power at the lowest windmilling speed and strong enough to maintain mechanical integrity at the highest engine speed.

SUMMARY OF THE INVENTION

A turbine engine emergency power system includes low and high pressure spools, the lower pressure spool including a low pressure compressor. A turbofan is coupled to the low pressure spool. The turbofan drives the low pressure spool in a windmill condition in which the low pressure turbine fails to provide rotational drive to the turbofan. A generator is rotationally driven by the low pressure spool in the windmill condition. A gear train is used to increase the speed of the generator in one example. In one example embodiment, a centrifugal clutch is used to selectively decouple the generator from the low pressure spool at a predetermined engine speed, which corresponds to normal operating speeds when the turbine engine is under power.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
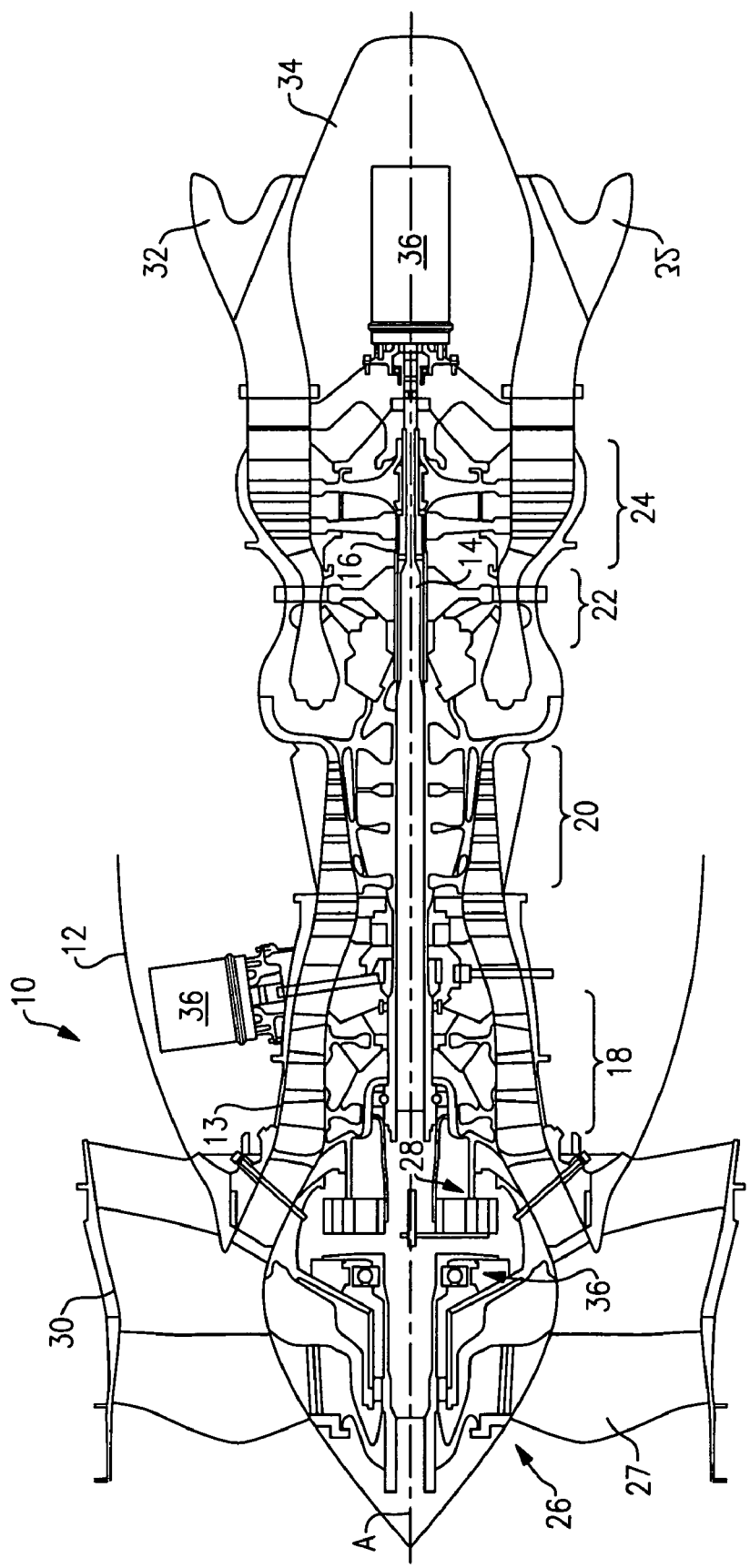
FIG. 1 is a cross-sectional view illustrating a turbine engine having three emergency generators driven by the turbofan in a windmill condition.

An example turbine engine 10 is shown in FIG. 1. The turbine engine 10 includes a core 12 having a housing 13. The example turbine engine 10 includes a two spool arrangement provided by first and second shafts 14, 16 that rotates about a common axis A. The first shaft 14 corresponds to a low pressure spool, and the second shaft 16 corresponds to a high pressure spool. The shafts 14, 16 rotate about an axis A. The first shaft 14 is coupled to a low pressure compressor section 18 and a low pressure turbine section 24. The second shaft 16 is coupled to a high pressure compressor section 20 and a high pressure turbine section 22. The shafts 14, 16 are supported within the housing 13 for rotation and typically include multiple portions secured to one another, as is known in the art.

A turbofan 26 having multiple blades 27 is typically coupled to the first shaft 14 by an epicyclic gear train 28, which reduces the speed of the turbofan 26. The turbofan 26 is arranged within a nacelle 30 to contain the blades 27, as is known in the art.

A nozzle 32 is arranged downstream from the low pressure turbine section 24. A tail cone 34 is arranged within the nozzle 32, as is known in the art. In one example, a generator 36 is arranged within the tail cone 34 and driven by the first shaft 14. Generators 36 additionally, and/or alternatively, may be mounted on the core 12 and/or near the turbofan 26 at the front of the turbine engine 10. As many or as few generators 36 can be used for a particular turbine engine as desired.

In the example turbine engine emergency power system, the generator 36 is driven during a windmill condition in which the turbofan 26 rotates the first shaft 14. In the windmill condition, the low pressure turbine section 24 does not provide rotational input to the first shaft 14. A windmill condition may occur during any number of situations, such as a stall or an ignition or combustion failure in the low pressure turbine section 24.

Figure 2:
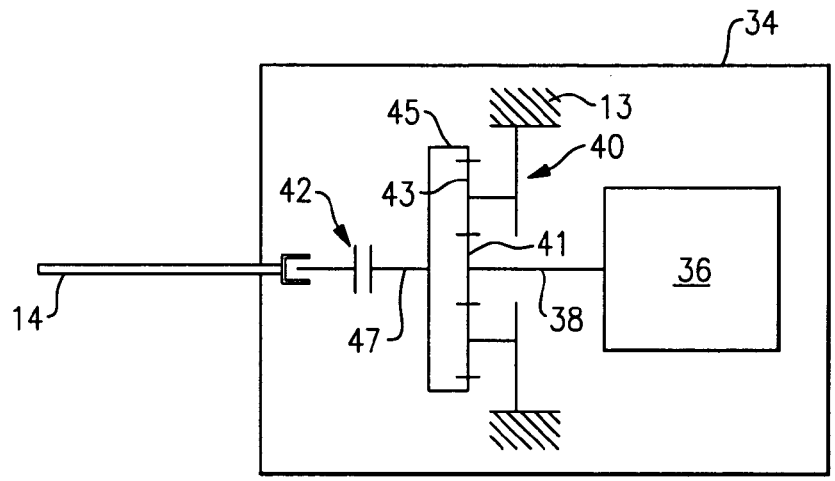
FIG. 2 schematically illustrates the generator arranged within a tail cone.

In the example shown in FIG. 2, the generator 36 is arranged within the tail cone 34. It is desirable to insulate the generator 36 from hot exhaust exiting the nozzle 32. A coupling 42, such as a centrifugal clutch, is arranged between the generator 36 and the first shaft 14 to selectively couple the first shaft 14 and generator 36 to one another. In one example, the rotational speed of the first shaft 14 under normal engine operating conditions may be approximately eight times the windmill condition speed of the first shaft 14. As a result, it may be desirable to provide a coupling 42 that decouples the first shaft 14 from the generator 36 above a predetermined rotational speed. As a result, the generator's parameters can be selected to provide desired performance during the lower rotational speeds experienced during the windmill condition.

A gear train 40 such as an epicyclic gear train, is arranged between the coupling 42 and a generator shaft 38. The gear train 40 increases the rotational speed provided to the generator shaft 38 so that the size of the generator 36 can be reduced. An input shaft 47 connected to the coupling 42 rotationally drives a ring gear 45. The ring gear 45 rotates star gears 43 that are fixed relative to the housing 13. The star gears 43 rotate a sun gear 41 that rotationally drives the generator shaft 38.

Figure 3:
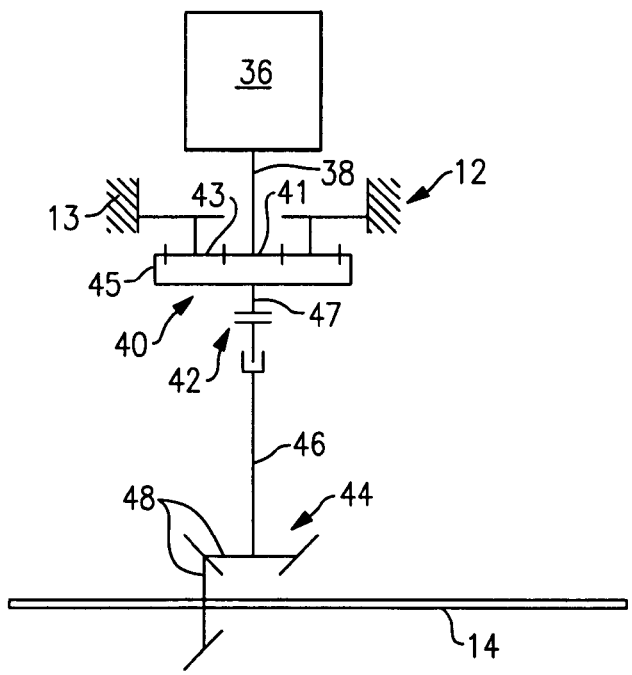
FIG. 3 schematically illustrates the generator mounted on a core of the turbine engine.

Referring to FIG. 3, the generator 36 is shown schematically mounted to the core 12. The generator shaft 38 is coupled to a tower shaft 46 through the gear train 40 and coupling 42. The tower shaft 46 is rotationally driven by the first shaft 14 through a gear set 44, which includes bevel gears 48. Unlike prior art arrangements that position the generator shaft parallel to the axis A, the generator shaft 38 is arranged transverse to the first shaft 14, and generally perpendicular thereto. This is possible due to the reduced size of the generator 36 enabled by the gear train 40.

Figure 4:
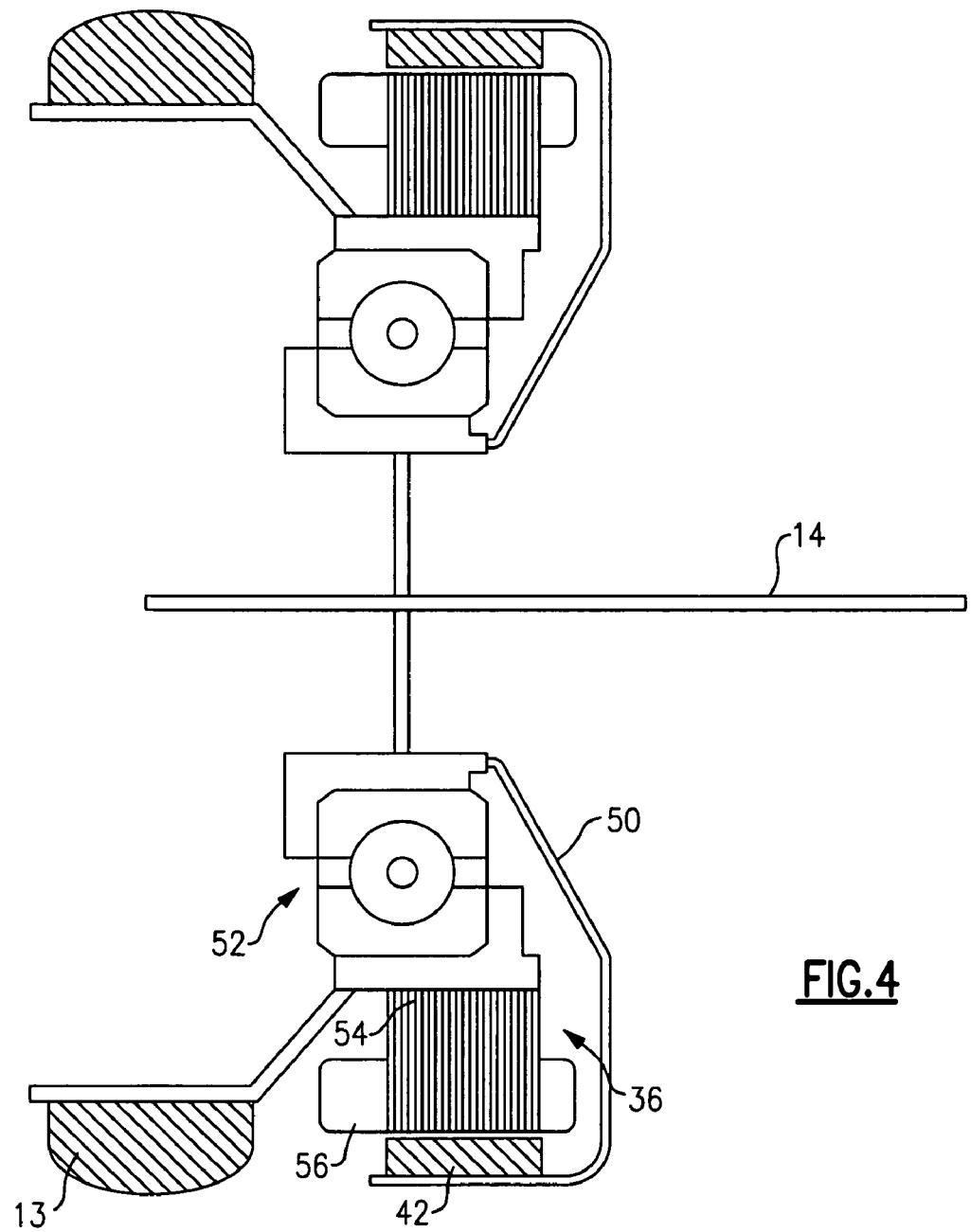
FIG. 4 schematically illustrates the generator arranged in a location near the turbofan.

FIG. 4 illustrates the generator 36 arranged near the turbofan 26. The first shaft 14 rotationally drives a shaft portion 50 that supports magnets 56 through the coupling 42. The shaft portion 50 is rotationally supported relative to the housing 13 by bearings 52. Unlike the arrangements shown in FIGS. 2 and 3, the increase in rotational speed of the generator as compared to prior art arrangements is provided by arranging the magnets 56 at the outer diameter of the generator 36, which provides an increase in linear speed of the magnets as compared to if they were arranged at the inner diameter of the generator 36. Rotation of the magnets 56 induces current in windings 54 of a rotor, which are affixed to the housing 13.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine engine emergency power system comprising:
   a first spool including a turbine;
   a turbofan coupled to the first spool, the turbofan driving the first spool in a windmill condition in which the turbine fails to provide rotational drive to the turbofan;
   a generator selectively rotationally driven by the first spool in the windmill condition; and
   a coupling arranged between the first spool and the generator for selectively driving the generator with the first spool in the windmill condition, wherein the coupling includes a centrifugal clutch.

2. The turbine engine emergency power system according to claim 1, wherein the first spool is a low pressure spool including a low pressure compressor, and the turbine is a low pressure turbine.

3. The turbine engine emergency power system according to claim 2, comprising a second spool including a high pressure compressor and a high pressure turbine.

4. The turbine engine emergency power system according to claim 2, wherein the low pressure spool includes a first rotational speed provided in a normal turbine engine operating condition, and a second rotational speed less than the first rotational speed in the windmill condition, the centrifugal clutch automatically disengaging the generator from the low pressure spool when the rotational speed increases from the second rotational speed to the first rotational speed.

5. The turbine engine emergency power system according to claim 1, wherein an epicyclic gear train is arranged between the coupling and a generator shaft that drives the generator, the generator shaft coupled to an output of the epicyclic gear train, the generator shaft has a first speed that is greater than a second speed which corresponds to the rotational speed of the turbofan in the windmill condition.

6. The turbine engine emergency power system according to claim 1, comprising a turbine engine having a housing including a tail cone, the generator arranged within the tail cone.

7. The turbine engine emergency power system according to claim 6, comprising a turbine engine having a core and the generator mounted on the core.

8. The turbine engine emergency power system according to claim 7, wherein the generator includes a generator shaft connected to the coupling, the coupling driven by a tower shaft rotationally driven by a gear set arranged between the tower shaft and the low pressure spool.

9. The turbine engine emergency power system according to claim 8, wherein the generator shaft and tower shaft are generally coaxial, the generator shaft and tower shaft transverse to the low pressure spool.

10. The turbine engine emergency power system according to claim 2, wherein the generator arranged near the turbofan, the generator including a magnet arranged radially outwardly relative to windings of the generator, the magnet rotationally driven by the low pressure spool.

11. The turbine engine emergency power system according to claim 10, wherein the coupling arranged between the magnets and a shaft portion that is rotationally driven by the low pressure spool.

12. The turbine engine emergency power system according to claim 11, wherein the winding are rotationally fixed relative to the housing, and the shaft portion rotationally supported relative to the housing by bearings.

13. The turbine engine emergency power system according to claim 1, wherein the generator is configured to be selectively decoupled from the first spool and coupled and rotationally driven by the first spool in the windmill condition.

14. A method of providing emergency power with a turbine engine comprising the steps of:
   a) disabling rotational drive to a turbofan provided by a turbine and decreasing a rotational speed of a spool to a predetermined speed;
   b) windmilling a turbofan with air passing through the turbine engine;
   c) automatically engaging a coupling at the predetermined speed to couple the windmilling turbofan to a generator; and
   d) rotationally driving the generator with the turbofan through the spool in response to performing step c) to generate emergency power, wherein a gear train is arranged between the coupling and the generator, wherein the coupling is a centrifugal cluth; for increasing the speed of the generator relative to the spool.

15. The method according to claim 14, wherein the turbine engine includes a high pressure spool having a high pressure turbine and a low pressure spool having a low pressure turbine, the spool being the low pressure spool.

* * * * *